INVENTORS.
JOHN W. BOZEK.
DAVID R. ROYER.

BY Hauke & Hauke
ATTORNEYS.

United States Patent Office 3,326,382
Patented June 20, 1967

3,326,382
FILTER ELEMENT
John W. Bozek, Waterford, and David R. Royer, Detroit, Mich., assignors to The Rosaen Filter Company, Hazel Park, Mich., a corporation of Michigan
Filed Aug. 19, 1964, Ser. No. 390,564
5 Claims. (Cl. 210—356)

The present invention relates to elements for fluid filtering systems and more particularly to an improved construction for such filter elements utilizing a flexible fabric as the filtering medium.

To increase the filtering area of a filter element of a given diameter it has long been the practice to corrugate or pleat the filtering medium. Woven wire and treated paper filtration media usually possess enough strength to retain any initial pleated or corrugated configuration. Filter elements made from these materials may require reinforcement to preserve the overall shape but the individual convolutions do not need support. A copending application Ser. No. 386,969, filed Aug. 3, 1964, now abandoned, by Borje O. Rosaen discloses a pleated filter element utilizing a flexible filtering material such as nylon or the like. To maintain the initial pleated form, the filtering media in sandwiched between a pair of corrugated screen members. Although such filter elements have proven to be satisfactory, the particular construction tends to reduce the effective filtration area of the filter element to some degree since no fluid flow can occur in those areas where the openings in the filtering fabric contact solid areas of the screen members. Further, since the fabric filtering material in held in a fixed position between the screened members some of the most important advantages of using flexible filtering materials are lost.

The present invention provides a filtering element in which a fabric such as nylon or the like is draped over a perforated or screen support. The support is formed to provide a plurality of spaced crests and contact between the support and the filtering fabric occurs only along the crests of the support. Sufficient room is provided to permit the fabric filtering material to flex outwardly away from the support during backflow so that a maximum cleaning effect can be obtained. By minimizing the areas of contact between the filtering fabric and the support a maximum open and filtering area is provided.

It is an object then of the present invention to improve filter elements by providing a construction for such elements utilizing a pleated perforated support member and a fabric filtering medium secured to the support member only at the crests thereof and in all other areas being spaced from the support member.

It is another object of the present invention to increase the cleaning action of filter elements utilizing a flexible filtering medium such as nylon or the like by providing a filter element construction which permits the filtering medium to be flexed outwardly upon back flow being produced through the filter element.

Still further objects and advantages of the present invention will readily occur to one skilled in the art to which the invention pertains upon reference to the following drawings in which like reference characters refer to like parts throughout the several views and in which FIG. 1 is a perspective side view of one preferred filter element of the present invention.

Figure 1:
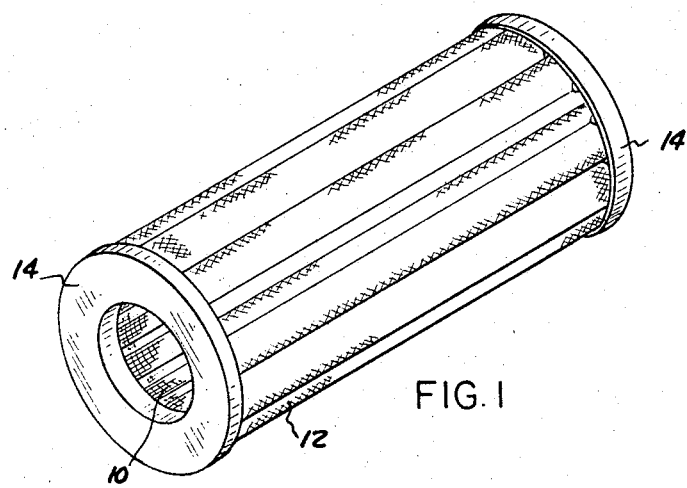
Figure 2:
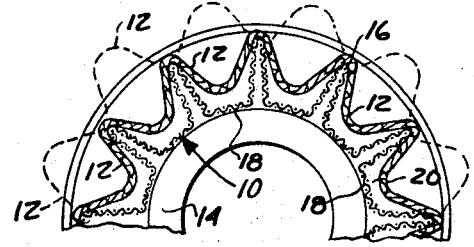
FIG. 2 is an enlarged fragmentary lateral cross-sectional view of the filter element ilulstrated in FIG. 1.

Now referring to the drawings for a more detailed description of the present invention, a preferred filter element is illustrated in FIGS. 1 and 2 as comprising a cylindrical support member 10, a filtering medium 12, and a pair of end caps 14.

As best illustrated in FIG. 2, the support member 10 is of a perforated construction and can if desired be in the form of a coarse mesh screen member. The support member 10 is preferably pleated to form a plurality of annularly spaced radially outwardly extending crest portions 16 joined by base portions 18. As illustrated in FIG. 2 the base portions 18 are formed on a common radius and are relatively wide to define a plurality of annularly spaced troughs 20 between each pair of adjacent crests 16. The filtering medium 12 is preferably constructed of a fine cloth material such as nylon or similar flexible fabric material and is draped over the pleated support member 10 so that contact occurs only along the crests 16 of the support member 10. To insure contact only along the crests 16 a rather sharp bend is formed to produce the crests 16 and the fabric 12 is draped to space the lower portions of the fabric 12 from the base portions 18. The fabric 12 is then attached firmly to the support member 10 at the lines of contact by chemical bonding, heat diffusion, or any other suitable means. After the support member 10 has been pleated, formed into a cylinder and the filtering medium 12 has been bonded to the crests 16 of the support member 10, the end caps 14 are bonded solidly to the ends of the support member 10 to form the completed filter element.

It is apparent that the filter element illustrated in FIGS. 1 and 2 provides a maximum open area for the filter medium 12 because the filtering medium 12 is unrestricted except where the lines of contact with one crest 16 of the support member 10 occur. The filter element illustrated in FIGS. 1 and 2 is intended to be used to filter a fluid flowing radially inwardly through the filter element. When it is desired to clean the filter element a back flow is produced radially outwardly through the element. During back flow the fabric 12 flexes outwardly as illustrated in dashed lines in FIG. 2 and the concave surface on which the foreign particles have accumulated becomes a convex surface. This outward movement and change in shape of the filtering fabric 12 tends to dislodge and throw off the foreign particles so that a maximum cleanability is produced.

Figure 3:
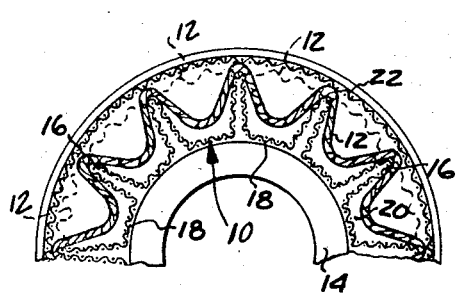
FIG. 3 is a view similar to FIG. 2 but illustrating another preferred filter element construction.

The construction illustrated in FIGS. 1 and 2 provides no means for protecting the filtering fabric 12 from large particles during use or against rough treatment when the element is being handled or cleaned. If desired the required protection may be obtained by covering the filtering fabric 12 with a flat cylindrical wire screen or perforated member 22 as illustrated in the embodiment shown in FIG. 3. The disadvantage however of such a screened member 22 is that the cleanability of the filtering fabric 12 is reduced since the flexing affect of the fabric 12 during back flow would be restricted as shown in dashed lines and dislodged articles would have to pass through the overlying screen member 22.

Figure 4:
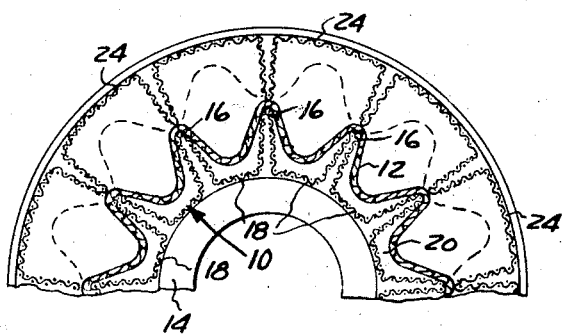
FIG. 4 is a view similar to FIGS. 2 and 3 but illustrating yet another preferred filter element construction.

To overcome this disadvantage the screen member 22 can be replaced with a perforated or screened member 24 as illustrated in FIG. 4 which is pleated to match the support member 10 but which is mounted with the two sets of pleats opposing each other and the fabric 12 is clamped between the two members 10 and 24 along the lines where the crests of the pleats meet. This construction completely protects the filtering fabric 12 without interferring with the desired reverse flexing during back flow and cleaning.

It is apparent that the screen or perforated members 10, 22 and 24 need to perform no filtering function in the filter elements of the present invention and are provided primarily for the purpose of supporting the filtering medium or fabric 12 and the end caps 14. These members provide a means of maintaining the flexible and non-self-supporting and filtering member 12 in a pleated and fixed position so that it can perform a filtering function with a minimum of contact between the filtering cloth 12 and the screened or perforated members 10, 22 and 24. In the embodiments illustrated in FIGS. 1, 2 and 4, the filtering medium 12 is supported in a manner which permits maximum flexing during back flow to produce a maximum cleaning effect on the filter element.

It is also apparent that although we have described but several embodiments of our invention many other changes and modifications can be made therein without departing from the spirit of the invention as expressed by the appended claims.

We claim:
1. A filter element comprising;
   (a) a cylindrical support member formed to provide a plurality of annularly spaced radially outwardly disposed crests, adjacent crests being joined by base portions,
   (b) a flexible filtering material having portions secured to said crests,
   (c) a second cylindrical support member overlying said first mentioned support member and said filtering material, and
   (d) said second support member being pleated to define a plurality of annularly spaced radially inwardly disposed crests, each of said crests of said second support member being disposed adjacent a corresponding crest of said first mentioned support member.

2. The filter element as defined in claim 1 and in which each pair of adjacent crests is spaced a greater annular distance than each pair of adjacent base portions.

3. The filtering element as defined in claim 1 and in which said filtering material is constructed of nylon.

4. A filtering element comprising;
   (a) a cylinder having a plurality of openings,
   (b) said cylinder being pleated to form a plurality of annularly spaced radially outwardly disposed crests, each pair of adjacent crests being joined by a base portion,
   (c) a filtering member carried by said cylinder and comprising a filtering cloth loosely draped between pairs of adjacent crests and being secured to said crests,
   (d) a pleated cylindrical member having a plurality of annularly spaced radially inwardly extending crests, each of said last mentioned crests being disposed adjacent a corresponding crest of said first mentioned cylinder, and
   (e) an end cap secured to each end of said cylinder, and said cylindrical member.

5. The filter element as defined in claim 4 and in which said filtering member is constructed of nylon.

References Cited

UNITED STATES PATENTS

| 2,826,308 | 3/1958 | Koupal | 210—356 X |
| 3,097,165 | 7/1963 | Kasten | 210—356 X |

FOREIGN PATENTS

| 151,049 | 3/1951 | Australia. |
| 20,663 | 1/1961 | East Germany. |
| 939,641 | 10/1963 | Great Britain. |

OTHER REFERENCES

Joseph: Comparative Study of Vacuum Filter Cloths, Sewage and Industrial Wastes, vol. 23 No. 8; August 1951, pages 977–981.

REUBEN FRIEDMAN, *Primary Examiner.*

D. M. RIESS, *Assistant Examiner.*